May 14, 1929.　　　　J. S. LACH　　　1,713,287
AUTOMOBILE LOCK MEANS
Filed Aug. 4, 1926　　2 Sheets-Sheet 1
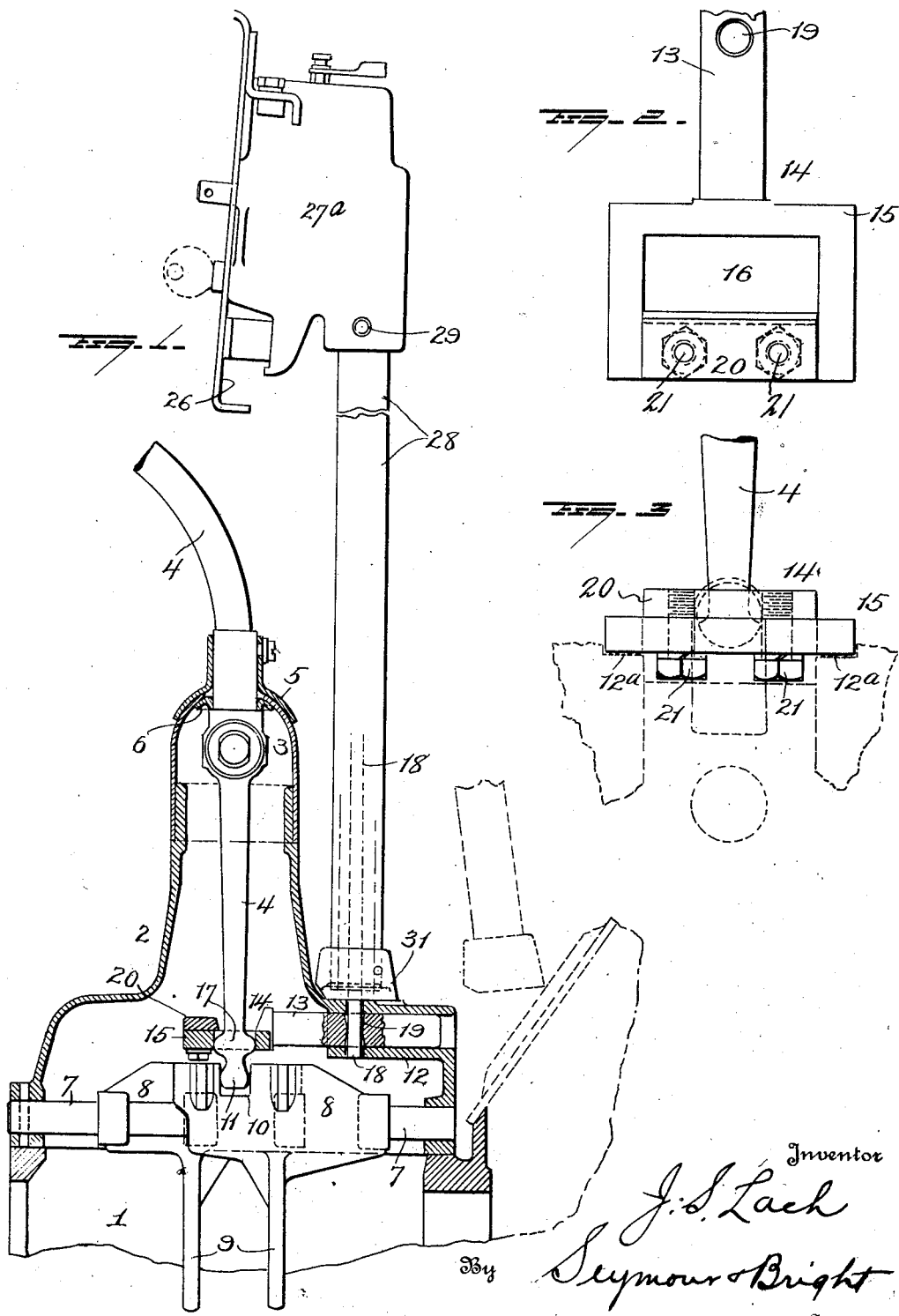

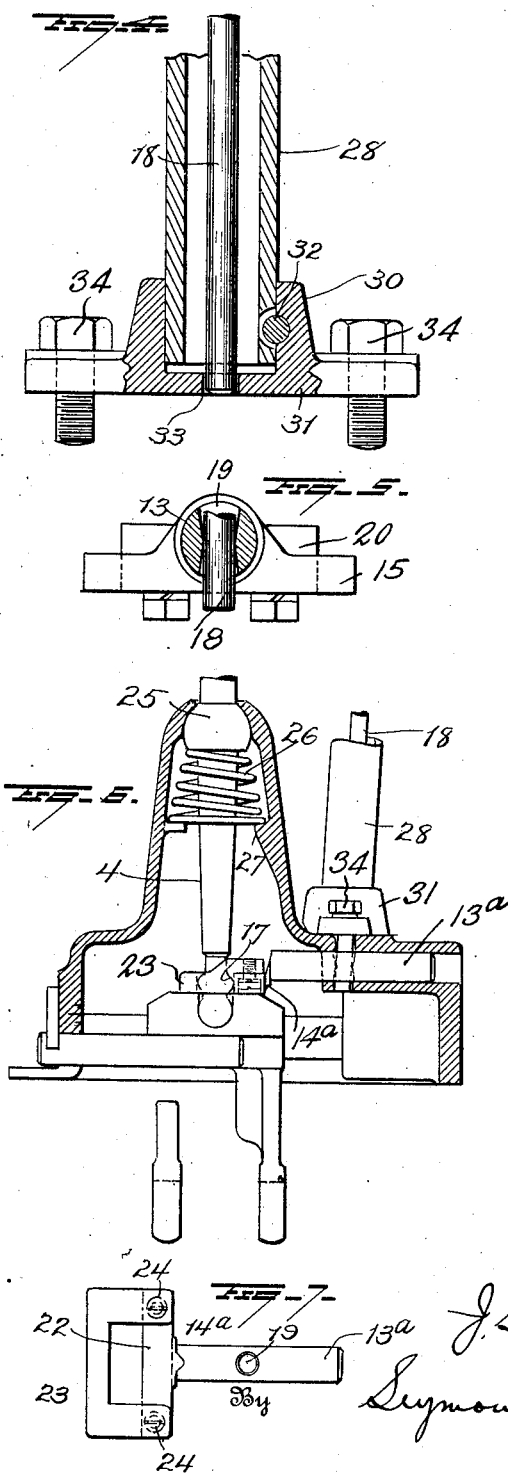

Patented May 14, 1929.

1,713,287

UNITED STATES PATENT OFFICE.

JOSEPH S. LACH, OF BRIDGEPORT, CONNECTICUT, ASSIGNOR TO THE YALE & TOWNE MANUFACTURING COMPANY, OF STAMFORD, CONNECTICUT.

AUTOMOBILE LOCK MEANS.

Application filed August 4, 1926. Serial No. 127,085.

This invention relates to improvements in locking means for automobiles and more particularly to means for locking the transmission control mechanism, one object of the invention being to provide simple and efficient means to lock the shift lever by means of which the gear shift blocks are controlled.

A further object is to provide a tubular armor for a lock-controlled bolt, said armor being so connected at its lower end with the transmission casing, that it may be detached therefrom when the bolt is in retracted position, and moved aside or removed.

With these and other objects in view, the invention consists in certain novel features of construction and combinations of parts as hereinafter set forth and pointed out in the claims.

In the accompanying drawings:

Figure 1 is a view partly in elevation and partly in section illustrating my improvements;

Figure 2 is an enlarged detail view showing the device which is cooperable with the shift lever for locking the same;

Figure 3 is a view showing the device of Figure 2 in end elevation and connection of the shift lever therewith;

Figure 4 is a sectional view, partly in elevation, showing the armor tube mounting and the lock-controlled bolt;

Figure 5 is a view partly in elevation and partly in section showing the cooperation of the bolt with the shift lever locking device, and Figures 6 and 7 are views illustrating a modification.

The transmission casing of an automobile is indicated at 1 and the transmission gearing (not shown) may be of any approved construction and arrangement in which shiftable gears and clutch means are employed. The casing 1 has mounted thereon, a dome casing or housing member 2 and this dome provides a mounting at 3 for a shift lever 4. In the construction shown in Figure 1, the shift lever is assembled in the casing dome by first passing the lower portion of said lever downwardly into the dome, and said lever may be provided with a guard 5 which is movable on the upper portion of the dome, and another guard 6 may be carried by the lever and bear against the inner face of the dome around the opening through which the lever passes.

Suitable supports, such as indicated at 7, are provided in the casing or housing member, for the accommodation of sliding shift blocks or members having arms 9 for cooperation with the shiftable members of the transmission mechanism. The shift blocks are recessed as at 10 to receive the lower end portion 11 of the shift lever 4.

Above the horizontal plane of the shift blocks and their supports, a horizontal guideway 12 open at both ends is provided in the casing member 2 for the accommodation of the bar 13 of a shift lever locking device 14. This lever locking device 14 also includes a rectangular frame 15 at the inner end of the bar 13 and preferably disposed in a plane somewhat below that of the axis of said bar. Supporting ledges 12$^a$ may be provided in the casing member for this frame. Within the elongated opening 16 of the frame 15, an enlargement 17 on the lever 4 is movable to permit the end portion 11 of said lever to be shifted into the recess 10 of one or another of the shift blocks or members 8, but the opening in said frame is so proportioned that the lever 4 cannot be operated to shift either of the blocks if the locking device 14 be locked against movement. The means for locking the device 14 consists of a bolt 18 which is movable through suitable holes in the wall of the casing member 2 and the lower wall of the guideway 12 and through a hole 19 (preferably having beveled walls) which extends transversely through the bar 13, as shown in Figure 1. To insure retention of the enlargement 17 of the shift lever in the opening of the frame 15, a plate or bar 20 is secured to the forward bar of the frame and caused to project over said opening,—said plate or bar 20 being secured to the frame by means of screws 21 passing upwardly through the frame bar and entering said bar 20, as shown in Figure 3.

In Figure 6 of the drawings, a construction is shown in which the shift lever is assembled by inserting it into the casing member from below instead of inserting it from above as in the construction shown in Figure 1, and in the arrangement shown in Figure 6, the lever locking device 14$^a$ is somewhat modified, as shown in plan in Figure 7. The device 14$^a$ comprises a bar 13$^a$ having a bolt hole 19 and provided at its inner end with a cross bar 22 disposed in a plane below that of the axis of the bar 13ª, and a U-shaped yoke 23, the free ends of the arms of which are secured, by means of upwardly projecting screws 24, to the end portions of the cross bar 22. A frame is thus formed to receive the enlargement 17 on the shift lever. The shift lever will be passed upwardly through the casing member before the yoke 23 shall have been applied, and a ball 25 on said lever caused to seat in the upper portion of the casing member, the lever being retained in place by means of a spring 26 bearing at one end against the ball and at the other end against a shoulder 27 within the casing member. When the lever shall have been applied as above explained, the yoke 23 may be secured to the cross bar 22, so that the enlargement 17 on the shift lever will be disposed in a frame formed by the cross bar 22 and yoke 23 at the inner end of the sliding bar 13ª.

The bolt 18 whereby the device 14 (14ª) may be locked against movement may be controlled by key controlled mechanism secured on the instrument board 26 of the car. The casing of the key controlled bolt operating mechanism is shown at 27ª, but it is not deemed necessary in this case to show and specifically describe such mechanism. Suffice it to say that said mechanism may be such as shown and described in my copending application Serial No. 127,083 filed simultaneously herewith. Between the casing 27ª and the transmission casing 2, a hardened steel tube 28 encloses the bolt 18 and constitutes an armor therefor. The upper end of this tube may have pivotal connection with the casing 27ª, as at 29, and the lower end of said tube is located in the socket portion 30 of a bracket 31 to which the tube is keyed, as indicated at 32. The bracket 31 is provided with a hole 33 for the accommodation of the bolt 18, and is removably secured to the casing member 2 by means of bolts 34. With such construction, the tube 28 with the bracket 31 may be disconnected from the casing member 2 and moved to the dotted line position shown in Figure 1, when the bolt 18 is in retracted position as shown in Figure 4.

It is apparent that when the bolt 18 is projected into locking relation to the bar 13 of the locking device 14 (or 14ª) as shown in Figure 1 (or Figure 6), the shift lever 4 will be effectually locked and manipulation of the gear shift blocks will be impossible. On the other hand, when the bolt 18 is in retracted position (Figure 4), the device 14 (14ª) may move freely when the shift lever is manipulated and the normal operation of the shift lever will be permitted.

Having fully described my invention what I claim as new and desire to secure by Letters-Patent, is:—

1. The combination with a transmission casing member, and the shift lever of the transmission control means of an automobile, of a lock bar movable in said casing member, a yoke connected with said bar and having an opening through which said shift lever passes, a bolt mounted vertically in the casing member to pass diametrically through said lock bar, and means for controlling the operation of said bolt.

2. The combination with the shift lever of transmission control means and a transmission casing member, of a device movable with said lever and comprising a sliding bar provided at one end with an elongated frame, the latter forming an elongated opening receiving the lever, a bar secured to said frame and overlying a portion of said opening and a part of the lever, and a key controlled bolt to enter the casing member and cooperate with said device to lock the same to lock the lever.

3. The combination with a shift lever and a transmission casing member, of a device disposed in the casing member and movable with said lever, said device comprising a bar and a frame integral with one end of said bar, said bar having a diametrical bolt hole, means for supporting and guiding said bar and frame, and a key controlled bolt to enter vertically alined openings in said casing member and the bolt hole in said bar, whereby said device will be locked to lock the shift lever.

4. The combination with a transmission casing, and a shift lever mounted therein, of a locking device for said lever mounted in the transmission casing and movable with said lever, a key-controlled bolt for locking said locking device, a casing for key controlled means, an armored tube through which said bolt passes, said tube being pivotally connected at its upper end with said last-mentioned casing, a bracket receiving the lower end of said tube and secured thereto, said bracket having a hole for the passage of said bolt, and means removably securing said bracket to the transmission casing.

In testimony whereof, I have signed this specification.

JOSEPH S. LACH.